Jan. 6, 1970        D. A. DAHL        3,487,900

ROLLER CLUTCH

Filed Dec. 13, 1967

INVENTOR
DAVID A. DAHL
BY R. C. Terry
ATTORNEY

United States Patent Office 3,487,900
Patented Jan. 6, 1970

3,487,900
ROLLER CLUTCH
David A. Dahl, Fort Collins, Colo., assignor to Teletype Corporation, Skokie, Ill., a corporation of Delaware
Filed Dec. 13, 1967, Ser. No. 690,160
Int. Cl. F16d *3/22, 15/00*
U.S. Cl. 192—55   4 Claims

ABSTRACT OF THE DISCLOSURE

A device for interconnecting the inner race of a roller type clutch and a drive shaft positioned within the inner race comprising annulus formed from polyurethane and having an outside diameter equal to the inside diameter of the clutch and an inside diameter equal to the outside diameter of the shaft and means for attaching the annulus to the inner race and to the shaft to form a resilient connection therebetween.

BACKGROUND OF THE INVENTION

This invention relates to roller clutches and the like. Particularly it relates to roller clutches, which may be adapted for cyclic latch operation under load conditions.

A roller clutch is characterized by an annular shiftable cage containing rollers which are arranged to be moved in opposite angular directions, through the agency of impeller means such as an expansion spring and a latch, to release and secure driving and driveable clutch parts. A clutch of the indicated class is well suited for loads imposing high forces on clutch parts, while coupled, uncoupled, and during coupling and uncoupling operations. Nevertheless, such high forces tend to jam the clutch and misalign its parts during regular clutch operation.

SUMMARY OF THE INVENTION

To minimize the undesirable effects, especially, misalignment, according to the invention, a positive engaging clutch, of the type having a drive member and a driven member concentrically disposed about a shaft, and wherein the clutching means comprises a plurality of rollers mounted in an annular cage arranged for angular motion between the driven and driving members for wedging the rollers between, and releasing said rollers from clutching engagement with, the members, is improved with a resilient annulus having an inner annular surface bonded to said shaft and an outer annular surface bonded to the inner of said members. Moreover, especially for minimizing jamming, the outer of the members has an inner surface with a plurality of wedge shaped notches into which said rollers project for releasably securing the members upon relative angular displacement of the outer member and the cage.

DESCRIPTION OF THE DRAWING

A more complete understanding of the invention may be had by referring to the following detailed description when taken in conjunction with the drawing wherein.

DETAILED DESCRIPTION

Figure 2:
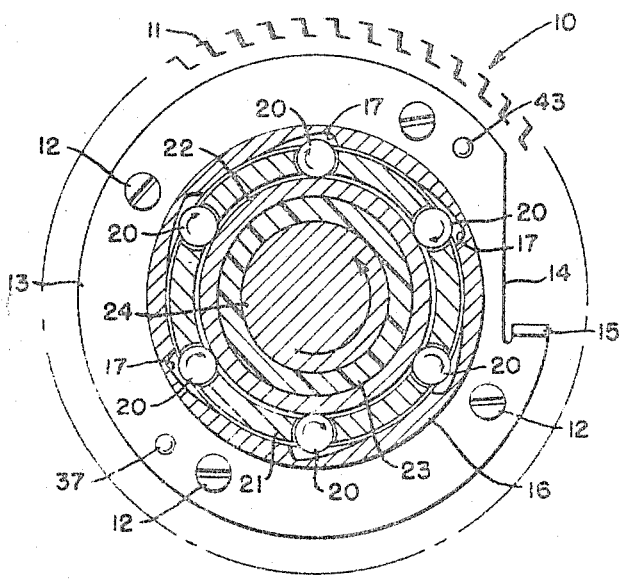
FIGURE 2 is a view similar to FIGURE 1 in which certain parts have been broken away more clearly to illustrate certain features of the invention.

Referring now to the drawing wherein like reference numerals designate like parts throughout the several views, with particular reference being had to FIGURE 2, there is shown a roller clutch assembly 10. A gear 11 serves as an output for the clutch and is adapted for meshing engagement with other gears to transfer power from the clutch to an output load. It should be understood that the gear 11 may be replaced by other output members such as pulleys, cams, etc., in accordance with the particular application of the clutch.

Secured to the gear 11 by means of a plurality of screws 12 is a plate 13 having a wedge shaped notch 14 formed in its outer edge and having an outwardly extending tab 15 formed on it. An outer clutch race 16 is secured to the inner edge of the plate 13 by suitable means such as brazing and has a plurality of wedge shaped notches 17 formed in it.

Mounted inside the outer race 16 and positioned within the notches 17 formed therein is a plurality of clutch rollers 20. The location of the rollers 20 relative to each other is maintained by a cage 21. Mounted within the rollers 20 and the cage 21 is an inner clutch race 22 which, like the outer race 16 and the rollers 20 is formed from a hard, wear resistant material, such as tool steel or the like.

Attached to the inside of the inner race 22 is a shock reducing connector 23 which may be formed from any resilient material but is preferably formed from a plastic such as polyurethane or the like. Attached to the inside of the shock reducing connector 23 is a drive shaft 24 which, for the purpose of this description may be considered as constantly rotating in a counter-clockwise direction but which in actual practice may be intermittently rotated at varying rates of speed in accordance wtih the particular use of the clutch. The shock reducing connector 23 may be attached to the drive shaft 24 and the inner race 22 by any suitable means but is preferably attached by bonding the parts together with an epoxy cement.

Figure 1:
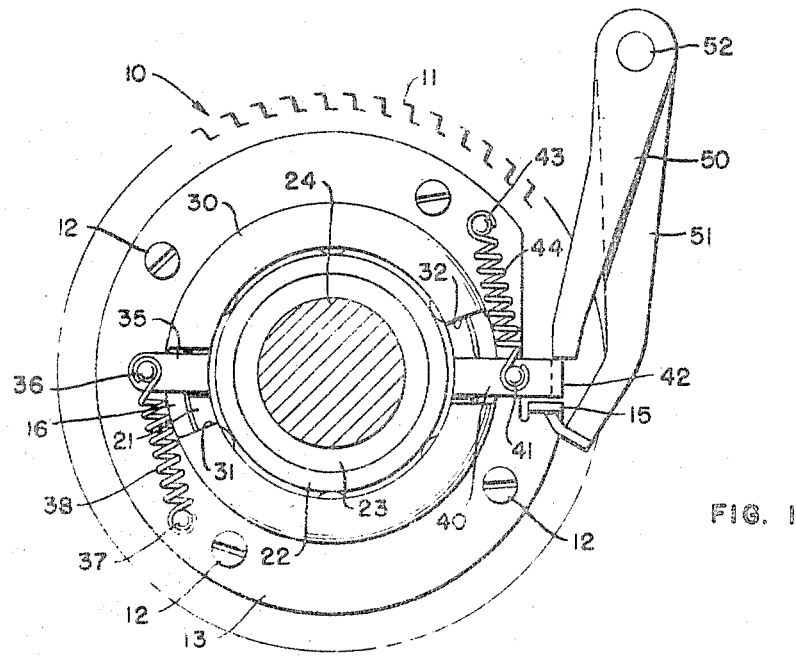
FIGURE 1 is a front view of a roller clutch employing the present invention.

Referring now to FIGURE 1 it will be seen that the rollers 20 and the cage 21 are enclosed by a shield 30 which is attached to the plate 13 and which completely surrounds the cage 21 except at two cutaway portions 31 and 32. Extending through the cutaway 31 is an arm 35 which is formed integrally with the cage 21 and which extends first axially and then radially away from the cage 21 to a position whereat it overlies the plate 13. Mounted on the end of the arm 35 is a pin 36 which is connected to a spring post 37 mounted on the plate 13 by means of a spring 38. Extending through the cutaway 32 is an arm 40 similar to the arm 35 which carries a pin 41 similar to the pin 36 but which extends past the pin 41 and terminates in a finger 42. The arm 40 is connected to a spring post 43 similar to the post 37 by means of a spring 44 similar to the spring 48.

Positioned adjacent the tab 15 on the plate 13 and the finger 42 of the arm 40 is an arm blocking lever 50 and a tab catching lever 51 both of which are pivotally supported on a pin 52 and both of which are adapted to movement away from the clutch assembly 10 by suitable means (not shown).

When it is desired to connect the gear 11 to the drive shaft 24 the arm blocking lever 50 and the tab catching lever 51 are moved away from the clutch assembly 10. This allows the arms 35 and 40 to move towards the pins 37 and 43 respectively under the action of the springs 38 and 44. Since the arms 35 and 40 are attached to the cage 21 this action moves the rollers 20 into the tapered portions of the wedge shaped openings 17 in the outer race 16. When the rollers 20 become jammed between the inner race 22 and the outer race 16 a positive drive connection is formed between the drive shaft 24 and the gear 11 thereby transferring the motion of the drive shaft 24 to the gear 11.

When it is desired to disengage the gear 11 from the drive shaft 24 the arm blocking lever 50 is returned to the position shown in the drawing. As the arm 40 completes a previously started revolution it engages the arm blocking lever 50 and is thereby prevented from rotating further. The inertia of the plate 13, the gear 11 and whatever may be in mesh with the gear 11 causes the plate 13 to continue to rotate until the tab 15 engages the arm 40. This action brings the cutaway portions of the wedge shaped openings 17 in the outer race 16 into alignment with the rollers 20 thus restoring the parts to the position shown in FIGURE 2. At this time the tab catch lever 51 is returned to the position shown in FIGURE 1 and is held in that position thereby preventing reverse movement of the gear 11 and whatever may be connected to it and also securing the clutch in a disengaged position.

Clutches of the type described are often unreliable in service because the extremely high forces experienced upon clutch engagement tend to damage and disaligned the parts and because the inherent design of the engaging members of the clutch causes such parts to jam together upon engagement thereby rendering clutch disengagement difficult. This phenomenon is overcome in the clutch illustrated by the polyurethane shock reducing connector 23 which is attached between the drive shaft 24 and the inner race 22 of the clutch. The connector 23 operates as a shock absorber and greatly softens the engagement shock of the clutch parts as they come together. Also, the restoring force of the connector 23 acts in a clutch disengaging direction. Therefore, whenever disengagement of the clutch parts is desired this action is greatly enhanced by the restoring force of the member 23.

While polyurethane has been designated as a preferred material for the member 23 it should be understood any material which is resilient relative to the material of the inner race 22 and the remaining clutch parts and which is strong enough to transfer the motion of the shaft 24 to the clutch 10 will serve satisfactorily as a shock absorbing connector. It should be further understood that while in the embodiment shown the inner race of the clutch is the driving member, it is possible to construct a clutch wherein the outer race is the driving member in which case the shock absorbing connector 23 would be positioned between the outer race and the member used to supply motion to the outer race and would thereupon serve the same function served by the connector 23 illustrated in the drawing.

Although only one embodiment of the invention is shown in the drawings and described in the foregoing specification it will be understood that the invention is not limited to that specific embodiment, but is capable of modification and rearrangement, and substitution of parts and elements without departing from the scope of the invention.

I claim:
1. In a positive engaging clutch of the type having a driven member and a driving member concentrically disposed about a shaft, and wherein the clutching means comprises a plurality of rollers mounted in an annular cage arranged for angular motion between said driven and driving members for wedging said rollers into and releasing said rollers from clutching engagement with said members, the improvement comprising: a continuous resilient annulus of uniform fabrication and cross-section having an inner annular surface bonded to said shaft and an outer annular surface bonded to the inner of said members.

2. A combination according to claim 1 wherein the resilient annulus is fabricated from polyurethane.

3. A combination according to claim 1 wherein the driving member is disposed inwardly from said driven member.

4. A combination according to claim 3 wherein the driven member has an inner surface with a plurality of angularly spaced wedge shaped notches into which said rollers project for releasably securing said members upon relative angular displacement of driven member and said cage.

References Cited

UNITED STATES PATENTS

| | | | |
|---|---|---|---|
| 1,674,226 | 6/1928 | Reed | 192—106.1 |
| 1,721,504 | 7/1929 | Reed | 192—55 XR |
| 1,803,077 | 4/1931 | Spase | 192—55 XR |
| 1,967,322 | 7/1934 | Permain | 192—55 XR |
| 2,140,737 | 12/1938 | Dickens | 192—27 |
| 2,644,560 | 7/1953 | Kleinschmidt | 192—27 |
| 2,985,271 | 5/1961 | Wilson | 192—55 XR |
| 3,034,621 | 5/1962 | Thomson | 192—27 |
| 3,062,346 | 11/1962 | Sharpe | 192—55 XR |
| 3,244,263 | 5/1966 | Fleming | 192—41 |

FOREIGN PATENTS 1,072,890  1/1960  Germany.

MARTIN P. SCHWADRON, Primary Examiner

L. J. PAYNE, Assistant Examiner

U.S. Cl. X.R.

192—27, 41, 106.1